April 18, 1967     A. A. HASSELBLAD ET AL     3,315,051
AUTOMATIC SAFETY SHUT-DOWN DEVICE FOR A MACHINE TOOL
Filed May 8, 1964     2 Sheets-Sheet 1
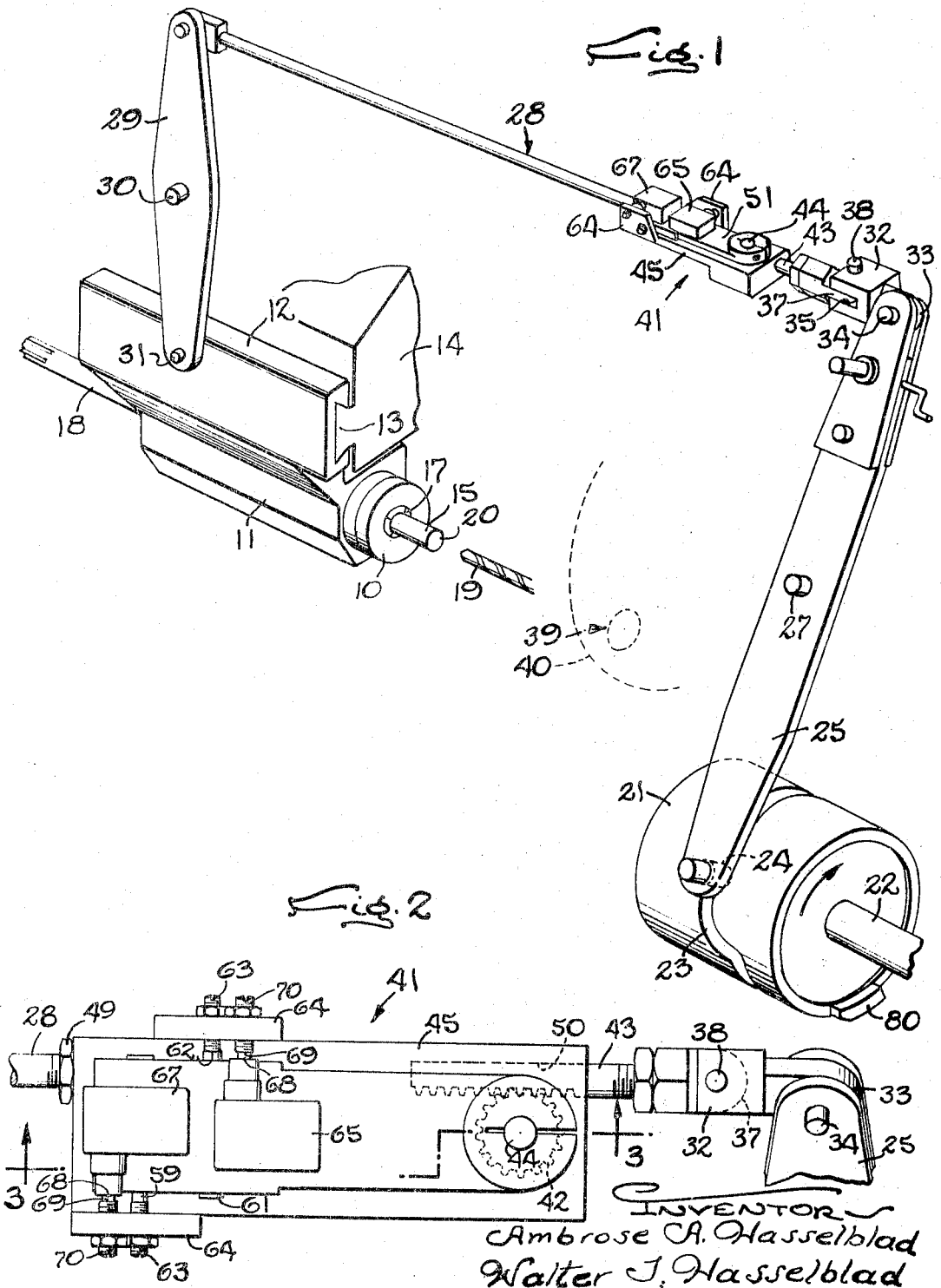

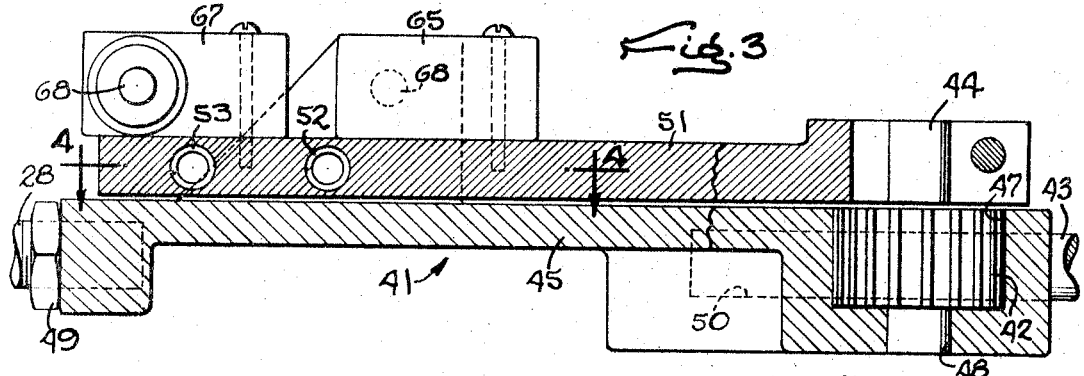
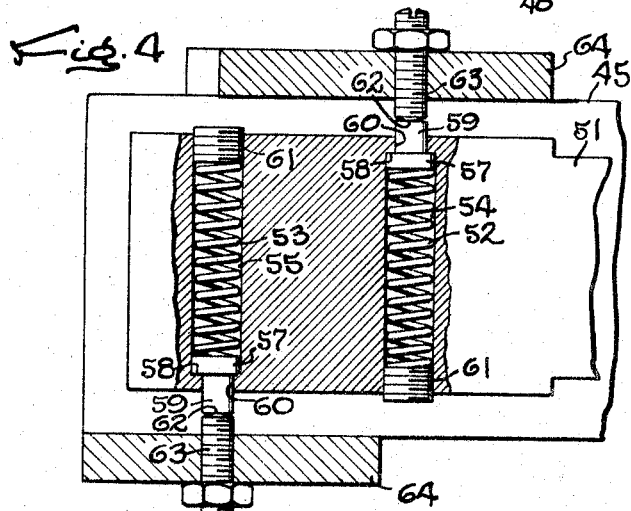
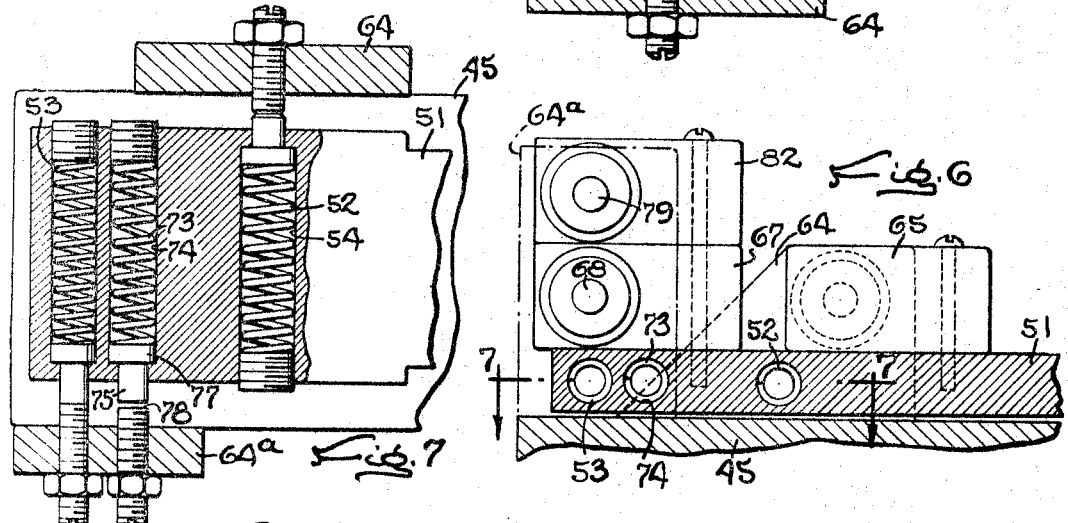
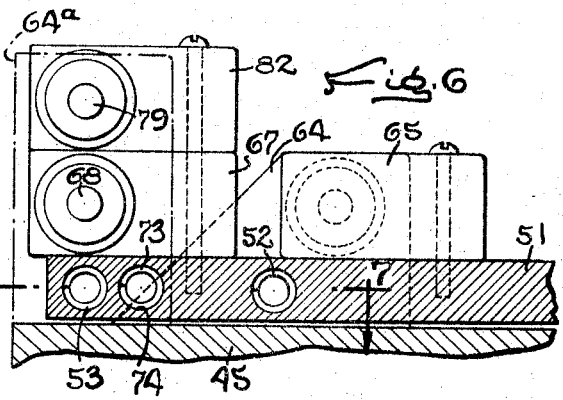
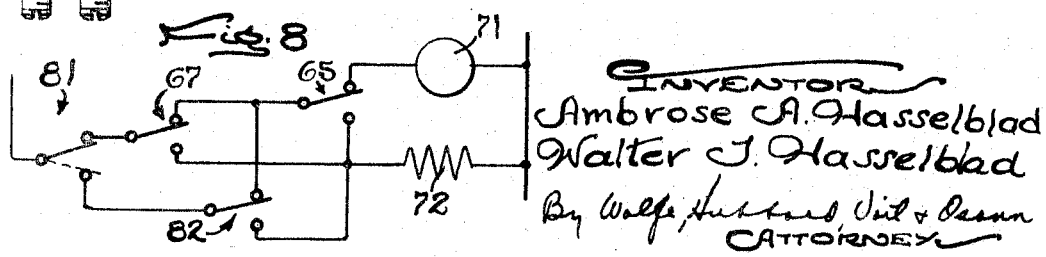

United States Patent Office 3,315,051
Patented Apr. 18, 1967

3,315,051
AUTOMATIC SAFETY SHUT-DOWN DEVICE FOR A MACHINE TOOL
Ambrose A. Hasselblad and Walter J. Hasselblad, both % Hasselblad Machine Co., 2405 Mason St., Green Bay, Wis. 54301
Filed May 8, 1964, Ser. No. 366,056
8 Claims. (Cl. 200—61.54)

This invention relates to automatic signal devices for sensing a malfunction in a machine tool and producing a signal indicating the occurrence of the malfunction so that corrective action may be taken before more serious damage occurs. More particularly, the invention relates to a shut-down device for sensing abnormal resistance to the movement of a machine element and immediately deactivating the machine. Such increased resistance can be caused by tool breakage, excessive dulling of a cutting tool, or jamming of one of the machine elements and, of course, continued automatic operation under these or similar circumstances could result in more serious damage to the machine or the production of a number of substandard workpieces.

The general object of the present invention is to provide a new and improved automatic shut-down device which is of relatively simple construction, is immediately responsive to preselected abnormal forces in both directions of movement of a reciprocating machine element and, at the same time, forms a yieldable driving connection between the reciprocating element and its actuator.

Another object is to increase or decrease this effective critical force at a selected point during a stroke of the machine element in order to adapt the device to anticipated changes in the normal working forces occurring during the stroke.

Other objects and advantages of the invention will become apparent from the following detailed description taken in connection with the accompanying drawings, in which FIGURE 1 is a fragmentary perspective view of an attachment for a multispindle automatic bar machine provided with a shut-down device embodying the novel features of the present invention.

FIG. 2 is an enlarged fragmentary plan view of the device and its connected parts.

FIG. 3 is an enlarged fragmentary cross-sectional view taken along the line 3—3 of FIG. 2.

FIG. 4 is a fragmentary cross-section taken along the line 4—4 of FIG. 3.

FIG. 5 is a fragmentary circuit diagram for the shut-down device.

FIG. 6 is a view similar to a portion of FIG. 3 showing a modified form of the invention.

FIG. 7 is a view similar to FIG. 4 of the modified form.

FIG. 8 is a circuit diagram for the modified form.

As shown in the drawings for purposes of illustration, the invention is embodied in an attachment (FIG. 1) for multispindle automatic bar machines including an auxiliary spindle 10 journaled in a head 11 carried by a reciprocating machine element in the form of a saddle 12 slidable back and forth along horizontal ways 13 on the usual tool slide 14 of the bar machine. A workpiece 15 is clamped in the collet 17 of the spindle and rotated with the spindle by the spindle drive shaft 18. An auxiliary tool 19 is mounted on a cross slide (not shown) for movement into the path followed by the workpiece during the forward stroke of the auxiliary head to perform a machining operation on the workpiece such as drilling a hole in the right-hand end 20 thereof.

While the head 11 and the spindle 10 may be reciprocated back and forth in various ways, the power actuating element shown herein for this purpose comprises a drum 21 (FIG. 1) mounted on a horizontal drive shaft 22 and haivng a peripheral cam groove 23 in which a follower roller 24 rides, the roller being mounted on the lower end of an elongated crank 25 fulcrumed intermediate its ends on the machine frame by means of a pin 27. The upper end of the crank is pivotally connected to one end of a generally horizontal link 28 in the form of an elongated rod pivoted at its other end on the upper end of a second crank 29. The latter also is fulcrumed intermediate its ends on the machine frame by means of a pin 30 and its lower end is pivotally connected to the saddle 12 by a pin 31.

The auxiliary cam drum 21 preferably is located adjacent the main drum (not shown) of the machine and is offset laterally from the spindle 10. To accommodate this offset, the crank 25 is disposed in an inclined plane as shown in FIG. 1 while the other crank 29 is substantially vertical, and an adaptor block 32 is provided between the crank 25 and the link 28 with an eye 33 disposed in the split end of the crank on one side of the block and receiving an inclined pivot pin 34, and with a groove 35 on the other side of the block receiving an eye 37 disposed in the horizontal plane of the rod 28 and pivoted on the block by a vertical pin 38.

With this arrangement, back and forth movements of the groove 23 and the roller 24 longitudinally of the drum 21 as the drum rotates in the direction of the arrow in FIG. 1 rock the two cranks 25 and 29 back and forth in unison to produce forward and return strokes of the head 11 and the workpiece 15. In the illustrative embodimnet of the invention, the auxiliary spindle 10 is alined with the last station 39 of the spindle carrier 40 of the bar machine and is moved forward during the usual cut-off operation to pick up each workpiece at the last station. The workpiece first is moved to the left to the position shown in FIG. 1 to permit the auxiliary tool to shift into the operating position shown, and then is advanced to the right into engagement with the tool. Upon completion of the machining, the head is retracted and the workpiece is released from the spindle.

During automatic operation, a malfunction may occur as the result of various conditions such as tool breakage, failure to complete the cut-off operation prior to the return stroke of the auxiliary head 11, or even excessive dulling of the tool 19. If the machine were to continue to operate under such conditions, more serious damage could occur and a substantial number of substandard parts could be produced. In each case, the malfunction produces abnormal resistance to movement of the saddle 12 and the head 11 by the operating linkage.

The present invention contemplates yieldably coupling the driving and driven elements of the machine with a new and improved automatic shut-down device 41 which is of relatively simple construction and is immediately responsive to preselected abnormal forces in both directions of movement of the head 11. To these ends, the shut-down device includes generally a pair of relatively movable members 42 and 43 connected respectively to the actuator 21 and the saddle 12 with means yieldably resisting movement of these members out of a predetermined relation with each other with forces correlated with the normal working forces developed in the machine. Consequently, during normal operation, the members transmit the working forces to the saddle and no relative motion of the members occurs. When abnormal forces develop, however, these forces overcome the resistance and cause relative motion of the members and this motion is sensed and utilized to deactivate the machine.

In this instance, the member 42 is a pinion gear fast on a vertical shaft 44 journaled on an elongated horizontal base plate 45 mounted on the right-hand end of the rod 28 and constituting an extension of the rod movable back and forth therewith. The pinion is fitted rotatably in an upwardly opening bore 47 in the base plate with the lower end of the pinion shaft journaled in a smaller co-axial bore 48 opening into the bottom of the pinion bore. The adjacent end of the rod 28 is threaded into the base plate and held securely in place by a lock nut 49 (FIGS. 2 and 3).

The second member 43 is a rack (see FIG. 2) threaded at one end into the body of the eye 37 pivoted on the adaptor block 32 with the opposite end portion of the rack telescoping into a longitudinal bore 50 in the base plate 45 generally tangent to one side of the pinion bore 47. Teeth on one side of the rack mesh with the pinion 42 and thereby couple the crank 25 to the base plate and the rod 28. Back and forth motion of the rack relative to the base plate is accommodated by turning of the pinion.

Fast on the upper end portion of the pinion shaft 44 is a lever 51 which extends radially from the shaft along the top of the base plate 45 and normally parallels the longitudinal axis of the plate and the path of reciprocation of the rod 28. Thus, during rotation of the pinion, the free end portion of the lever swings to one side or the other about the pinion axis. To resist such swinging, two springs 52 and 53 acting between the base plate and the lever urge the latter toward its normal position shown in FIG. 2.

Herein, the springs 52 and 53 are helically coiled compression springs fitted in two bores 54 and 55 opening laterally through opposite side edges of the lever 51 adjacent the free end of the latter. A plunger 57 is disposed against the bottom 58 of each bore with a stem 59 projecting through a smaller coaxial bore 60 and outwardly from the side edge of the lever. Plugs 61 threaded into the open ends of the spring bores preload the springs against the plungers to hold the stems in the projecting positions. Of course, the force exerted by each spring may be selected for a particular application by varying the weight of the spring or by tightening or loosening the associated plug.

Mounted on the base plate 45 on opposite sides of the free end portion of the lever 51 are two stops 62 which engage the stems 59 in the normal position of the lever. As shown in FIGS. 2 and 4, these stops are formed by the inner ends of two studs 63 threaded through plates 64 fast on the opposite side edges of the base plate and projecting upwardly therefrom in spaced relation with the sides of the lever. With this arrangement, the stops coact with the springs to resist rotation of the lever relative to the base plate.

To sense movement of the lever 51 relative to the base plate 45, two sensing switches 65 and 67 are mounted on top of the lever in the manner shown in FIG. 3 with the operators 68 of the switches engaging two additional stops 69 formed by the inner ends of studs 70 threaded through plates 64 alongside the studs 63. Thus, in either direction of swinging of the lever, one of the switches will be actuated by the associated stop 69. Each of the studs 63, 70 is adjustably positioned in the block 64 to permit precise positioning of the stops 62, 69.

A simple circuit for utilizing the signals produced by switches 65, 67 to control operation of the machine is shown schematically in FIG. 5. Both switches include two sets of companion contacts, one set 65a, 67a normally being closed in the circuit of a drive motor 71 for the auxiliary drum 21 and the other set 65b, 67b normally being open in parallel lines for completing a circuit to two sets of companion contacts, one set 65a, 67a normally engaged clutch (not shown) in the drive for the bar machine. Thus, upon actuation of either switch, the drive motor is de-energized and the clutch is disengaged.

The operation of the shut-down device should be apparent from the foregoing description. During normal machine operation, the head 11 is reciprocated back and forth by the drum 21 acting through the cranks 25 and 29, the connecting rod 28 and the shut-down device 41. The two springs 52 and 53 are preloaded to an extent sufficient to hold the lever 51 stationary on the base plate 45 under normal operating forces so that motion is transmitted as if there were a rigid connection between the cranks. It should be noted that the arrangement of the springs on the lever provides a substantial mechanical advantage making possible the use of lighter springs for given conditions of operation. The lever and the pinion 42, in effect, constitute a bell crank and the mechanical advantage, of course, depends upon the ratio of the lever length to the pinion radius.

If the force applied to the shut-down device exceeds a selected value, the lever 51 will swing in one direction or the other depending upon the direction of movement of linkage at the time the increase occurs, de-energizing the drive motor 71 and disengaging the clutch. It will be seen that the lever also serves to amplify the relative motion occurring at the pinion 42 to increase the responsiveness of the shut-down device and reduce the play in the linkage. It will also be evident that the selected critical forces during the forward and return strokes may differ substantially and are readily adjustable independently of each other.

A modified form of the invention is illustrated in FIGS. 6 through 8 in which the effective critical force may be changed during one of the strokes of the head 11, the forward stroke in the illustrative embodiment. This is accomplished by adding a third spring 73 compressed in a third bore 74 to resist swinging of the lever in one direction, counterclockwise in FIG. 7, and arranging this spring so that it is brought into play only after a predetermined amount of yielding of the spring 53. The latter exerts a smaller resistance than the spring 73 and in the same direction.

For these purposes, the stem 75 of the plunger 77 in the bore 74 of the stronger spring 73 is spaced from the associated stop 78 as shown in FIG. 7, and the switch operator 79 (FIG. 6) of a third switch 82 mounted on top of the switch 67 is spaced a corresponding distance from its stop (not shown), the stops for the stacked switches 67 and 82 in this instance being mounted on a plate 64a alongside the switches as shown in phantom in FIG. 6. A dog 80 (FIG. 1) herein mounted on the drum 21 operates a selector switch 81 (FIG. 8) which changes the critical resistance at a predetermined point in the forward stroke of the head 11. For example, the stroke may be started with the selector switch in the condition shown in FIG. 8 in which the switch 67 associated with the lighter spring 53 is in series with the switch 65 controlled by the oppositely acting spring 52, upon actuation of either of these switches, the circuit to the motor 71 is opened and the coil 72 is energized to disengage the clutch. A relatively small resistance to counterclockwise swinging of the lever is provided by the spring 53 so that correspondingly small forces are capable of deactivating the machine.

After the dog 80 trips the selector switch 81 to its alternate position shown in broken lines in FIG. 8, the circuit to the motor 71 is through the switch 82 associated with the stronger spring 73 so that a force sufficient to overcome the spring 53 merely swings the lever 51 counterclockwise (FIG. 7) until the plunger stem 75 engages the stop 78. Operation of the switch 67 has no effect on either the motor 71 or the coil 72. Then a force greater than the effective resistance of the spring 73 is necessary before further counterclockwise swinging will occur to disable the machine. Such further swinging operates the switch 82 to break the circuit to the motor 71 and complete a circuit to the clutch coil 72.

The selection of the different critical resistances may be automatic as described herein or may be accomplished manually. This arrangement is particularly useful where substantially different forces normally occur during different portions of a given stroke and it is desirable to detect abnormal increases in the lower range that may be less than the normal higher forces during the other portion of the stroke.

From the foregoing, it will be seen that the shut-down device 41 is of relatively simple but sturdy construction and is quickly responsive to operating forces above selected critical forces. The rack 43 and the pinion 42 effecting the movable connection in the linkage readily accommodate relative motion in the linkage in both directions of movement thereof, and the lever 51 serves both as means for amplifying this motion without excessive play and as means for increasing the mechanical advantage of the springs.

We claim as our invention:

1. An automatic shut-down device for deactivating a machine tool including a reciprocating machine element and an actuating element therefor, said device having, in combination, a reciprocating base connected to one of said elements, a gear journaled on said base for rotation about a predetermined axis, a reciprocating rack meshing with said gear and connected to the other of said elements to transmit motion from said actuating element, through said gear and said base, and to said machine element, a lever fast on said gear and extending radially of said axis along said base in a predetermined angular position, a first spring acting between the free end portion of said lever and said base and yieldably resisting swinging of the lever in one direction from said position by exerting a first predetermined force on the lever, a second spring acting between said one end portion and said base and yieldably resisting swinging of said lever in the other direction from said position by exerting a second predetermined force on the lever thereby to maintain the lever in said position in both directions of movement of said machine element and to prevent rotation of said gear and thus relative movement of said rack and said gear where the forces exerted on said springs are less than said predetermined forces, and means for sensing swinging of said lever in either direction from said position where the forces on said spring exceed said predetermined forces and as an incident to rotation of said gear, and said means producing a signal indicating such swinging.

2. A device as defined in claim 1 further including means for selectively and independently adjusting said predetermined forces exerted by said springs.

3. A device as defined in claim 1 further including a third spring exerting a third predetermined force greater than the force of said first spring and mounted on said base to act on said lever in the same direction as said first spring, and means for selectively and independently adjusting said first and third springs to vary the effective force in said one direction.

4. An automatic shut-down device for deactivating a machine tool including a reciprocating machine element and an actuating element therefor, said device having, in combination, a movable base connected to one of said elements, a gear journaled on said base for rotation about a predetermined axis, a rack meshing with said gear and connected to the other of said elements to transmit motion from said actuating element, through said gear and said base, and said machine element, a lever fast on and rotatable with said gear and to extending radially of said axis along said base in a predetermined angular position, first means acting between said lever and said base with a predetermined force and yieldably resisting rotation of the gear and swinging of the lever in one direction from said position, second means acting between said lever and said base with a predetermined force and yieldably resisting rotation of the gear and swinging of the lever in the other direction from said position whereby said lever and said gear are held yieldably against moving relative to said rack, and means for sensing swinging of said lever from said position as an incident to relative movement between said gear and said rack and producing a signal indicating such swinging.

5. An automatic shut-down device for deactivating a machine tool including a reciprocating machine element and an actuating element therefor, said device having, in combination, a base connected to one of said elements to reciprocate back and forth therewith, a first member journaled on said base for rotation about a predetermined axis extending transversely of the path of reciprocation of the base, a second member connected to the other of said elements and reciprocable along a path generally parallel to the path of said base, said second member being connected to said first member at a point spaced radially from said axis to transmit motion from said actuating element, through said first member and said base, and to said machine element, said first member including a lever arm projecting radially from said axis in a predetermined angular position relative to said base, first spring means yieldably resisting swinging of said arm in one direction from said predetermined position with a first predetermined force, second spring means yieldably resisting swinging of said arm in the other direction from said predetermined position with a second predetermined force, third spring means for yieldably resisting further swinging of said arm in said one direction with a third force greater than said first force after a predetermined amount of yielding of said first spring means, means for sensing swinging of said arm in both directions from said predetermined position, and additional means for sensing said further swinging.

6. An automatic shut-down device for deactivating a machine tool including a reciprocating machine element and an actuating element therefor, said device having, in combination, a base connected to one of said elements to reciprocate back and forth therewith, a first member journaled on said base for rotation about a predetermined axis extending transversely of the path of reciprocation of the base, a second member connected to the other of said elements and reciprocable along a path generally parallel to the path of reciprocation of said base, said second member being connected to said first member at a point spaced radially from said axis to transmit motion from said actuating element, through said first member and said base, and to said machine element, means acting between said base and said first member and yieldably resisting rotation of the latter in both directions about said axis thereby to resist relative movement of said members, and means for sensing rotation of said first member in either direction and producing a signal indicating such movement.

7. An automatic shut-down device for deactivating a machine tool including a reciprocating machine element and an actuating element therefor, said device having, in combination, a base connected to one of said elements for movement therewith, a gear journaled on said base for rotation about a predetermined axis, a rack tangent to and meshing with said gear and connected to the other of said elements to transmit motion from said actuating element, through said gear and said base, and to said machine element, spring means acting between said base and said gear and yieldably resisting rotation of the gear about said axis from a predetermined angular position thereby to resist relative movement of the gear and said rack, and means for sensing rotation of said gear from said position and producing a signal indicating such rotation.

8. A device as defined in claim 5 in which said sensing means comprises a pair of switches disposed at opposite sides of and actuated by said arm, and said additional sensing means comprises a third switch disposed at one side of and actuated by said arm.

References Cited by the Examiner
UNITED STATES PATENTS

| | | | |
|---|---|---|---|
| 2,208,119 | 7/1940 | Chandler | 192—150 |
| 2,222,716 | 11/1940 | Mageoch | 200—52 X |
| 2,484,616 | 10/1949 | Dulaney | 192—150 X |
| 2,602,529 | 7/1952 | Smathers | 200—61 X |

BERNARD A. GILHEANY, *Primary Examiner.*

J. BAKER, *Assistant Examiner.*